United States Patent [19]

Karr

[11] Patent Number: 4,969,162
[45] Date of Patent: Nov. 6, 1990

[54] POLLED DATA NETWORK AUTO-EQUALIZER SYSTEM AND METHOD

[75] Inventor: Lawrence J. Karr, Santa Monica, Calif.

[73] Assignee: Telerate Systems Incorporated, New York, N.Y.

[21] Appl. No.: 349,100

[22] Filed: May 9, 1989

[51] Int. Cl.$^5$ .............................................. H04B 3/06
[52] U.S. Cl. ......................................... 375/12; 333/18; 375/15; 375/60
[58] Field of Search ...................... 375/11, 12, 13, 14, 375/15, 16, 60; 178/63 B, 69 R; 333/18; 364/724.2

[56] References Cited

U.S. PATENT DOCUMENTS

| | | | |
|---|---|---|---|
| 3,566,271 | 2/1971 | Whang et al. | 375/12 |
| 3,593,142 | 7/1971 | Freeny et al. | 375/12 |
| 3,935,535 | 1/1976 | Motley et al. | 375/13 |
| 4,416,015 | 11/1983 | Gitlin | 375/14 |
| 4,489,416 | 12/1984 | Stuart | 375/8 |
| 4,837,780 | 6/1989 | Grover | 375/11 |

Primary Examiner—Benedict V. Safourek
Attorney, Agent, or Firm—Roy J. Mankovitz

[57] ABSTRACT

An improved auto-equalizer technique is disclosed for use in two-way communications systems having terminals which are connected by a communications link having distortion characteristics which are substantially identical for signals traveling in either direction. The technique includes a master modem which is always first to transmit in the system, and one or more remote modems. Each remote modem includes an adaptive filter in the receiver section of the modem which adaptively sets its filter characteristics to be the inverse of the line distortion characteristics. Each remote modem also includes a slave filter in the transmitter section which is also set have filter characteristics which are substantially the same as that of the adaptive filter. The slave filter acts to pre-distort the signals transmitted from the remote modem so that they arrive at the master modem substantially undistorted.

6 Claims, 4 Drawing Sheets

POLLED DATA NETWORK AUTO-EQUALIZER SYSTEM AND METHOD

BACKGROUND OF THE INVENTION

This invention relates to two-way communications systems and, more particularly, to polled data networks employing high speed modems interconnected by telephone lines.

Communications networks for interconnecting digital devices such as computers and facsimile machines traditionally employ a modem (modulator/demodulator) at each communications site. Each modem includes transmitter and receiver circuits which convert digital data to analog signals suitable for transmission and reception over telephone lines. In order to increase the efficiency of such systems, there is a trend toward modem designs which are able to transmit and receive data at ever higher data rates.

Traditional modem designs provide data communications rates of 300 to 1200 bits per second (bps). At data rates of 2400 bps and above, the signal distortion characteristics of the telephone lines becomes a major design consideration. Such distortion characteristics include amplitude and phase distortion which must be compensated for, or equalized, in order to effect high speed communications with low data errors.

Traditionally, line distortion is compensated for by employing adaptive filters in the receiver portions of each modem in the system. These filters and their associated circuitry, sometimes referred to as autoequalizers, generally include tapped delay lines, where each tap is associated with a variable gain coefficient which is adaptively set in response to a received data sequence. The adaptive circuits may use one of a number of convergence techniques to iteratively vary the filter gain coefficients until the filter output signal is compensated for the distortion characteristics of the line.

One of the drawbacks of the prior art auto equalizer methods is the time required (referred to as equalizer time) for the equalizer circuits to converge to the desired signal compensation. For example, a typical 4800 bps modem may require 50 milliseconds or more of equalizer time, and a 9600 bps modem employing state of the art equalizer techniques may still require 20 milliseconds or more of equalizer convergence time. Since additional data cannot be received until the equalizer has converged, this time interval represents the waste of valuable data transmission time, as well as the additional expense of telephone line charges.

The above described problem is compounded in polled data networks requiring a large number of relatively short transmissions to be received from many remote sites. In such instances, it may well be that the equalizer convergence time, which is required for each new transmission received at a remote site, is substantially longer than the actual data transmission time.

Accordingly, it is an object of the present invention to provide a new and improved communications system.

It is another object of the present invention to provide a polled data network employing a master and remote modems, in which the communications line equalizer cnvergence time is eliminated for signals received by the master modem in the system.

SUMMARY OF THE INVENTION

The foregoing and other objects of the invention are accomplished by providing a two-way communications system for transferring signals in both directions between a first site and a second site via a bi-directional communications link having signal distortion characteristics which are substantially identical for signals traveling in either direction.

The system includes a first receiver located at the second site, a second receiver located at the first site, a first transmitter located at the first site for transmitting a first signal to the first receiver via the communications link, and a second transmitter located at the second site for transmitting a second signal to the second receiver means via the communications link.

The system further includes a first filter located at the second site for filtering the received first signal, where the first filter has filter characteristics which ares substantially the inverse of the communications link signal distortion characteristics to compensate the received first signal for the distortion of the communications link, thus providing a substantially undistorted version of the first signal.

A second filter is located at the second site for filtering the second signal to form a filtered second signal which is transmitted by the second transmitter, where the second filter has filter characteristics which are substantially the inverse of the communications link signal distortion characteristics, so that the transmitted filtered second signal is compensated for the distortion of the communications link, whereby the filtered second signal is received by the second receiver as a substantially undistorted version of the second signal.

In a preferred embodiment of the invention, the first filter adaptively establishes a first set of filter coefficients during a first interval of time in response to the received first signal, where the first set of filter coefficients determines the filter characteristics of the first filter. The second filter is also responsive to the first set of filter coefficients, which establishes the filter characteristics of the second filter as substantially the same as the filter characteristics of the first filter. The second signal is transmitted after the completion of the first interval of time.

A method of compensating for communications link signal distortion in a two-way communications system is also disclosed. The system is one which transfers signals in both directions between a first site and a second site via a bi-directional communications link having signal distortion characteristics which are substantially identical for signals traveling in either direction.

The method includes the step of providing a first receiver located at the second site, providing a second receiver located at the first site, providing a first transmitter located at the first site for transmitting a first signal to the first receiver via the communications link, and providing a second transmitter located at the second site for transmitting a second signal to the second receiver via the communications link.

The method further includes the steps of first filtering with a first filter located at the second site the received first signal, adaptively establishing a first set of filter coefficients during a first interval of time in response to the received first signal, where the first set of filter coefficients determines the filter characteristics of the first filter means, which are substantially the inverse of the communications link signal distortion characteristics to compensate the received first signal for the distortion of the communications link, thus providing a substantially undistorted version of the first signal.

The method further includes the steps of second filtering with a second filter located at the second site the second signal to form a filtered second signal which is transmitted by the second transmitter, where the second filter responds to the first set of filter coefficients, establishes the filter characteristics of the second filter means as substantially the same as the filter characteristics of the first filter means, and the second signal is transmitted after the completion of the first interval of time.

Other objects, features and advantages of the invention will become obvious from a reading of the specification in conjunction with the drawings, in which like references designators refer to like elements throughout the several views.

DESCRIPTION OF THE PRIOR ART

Figure 1:
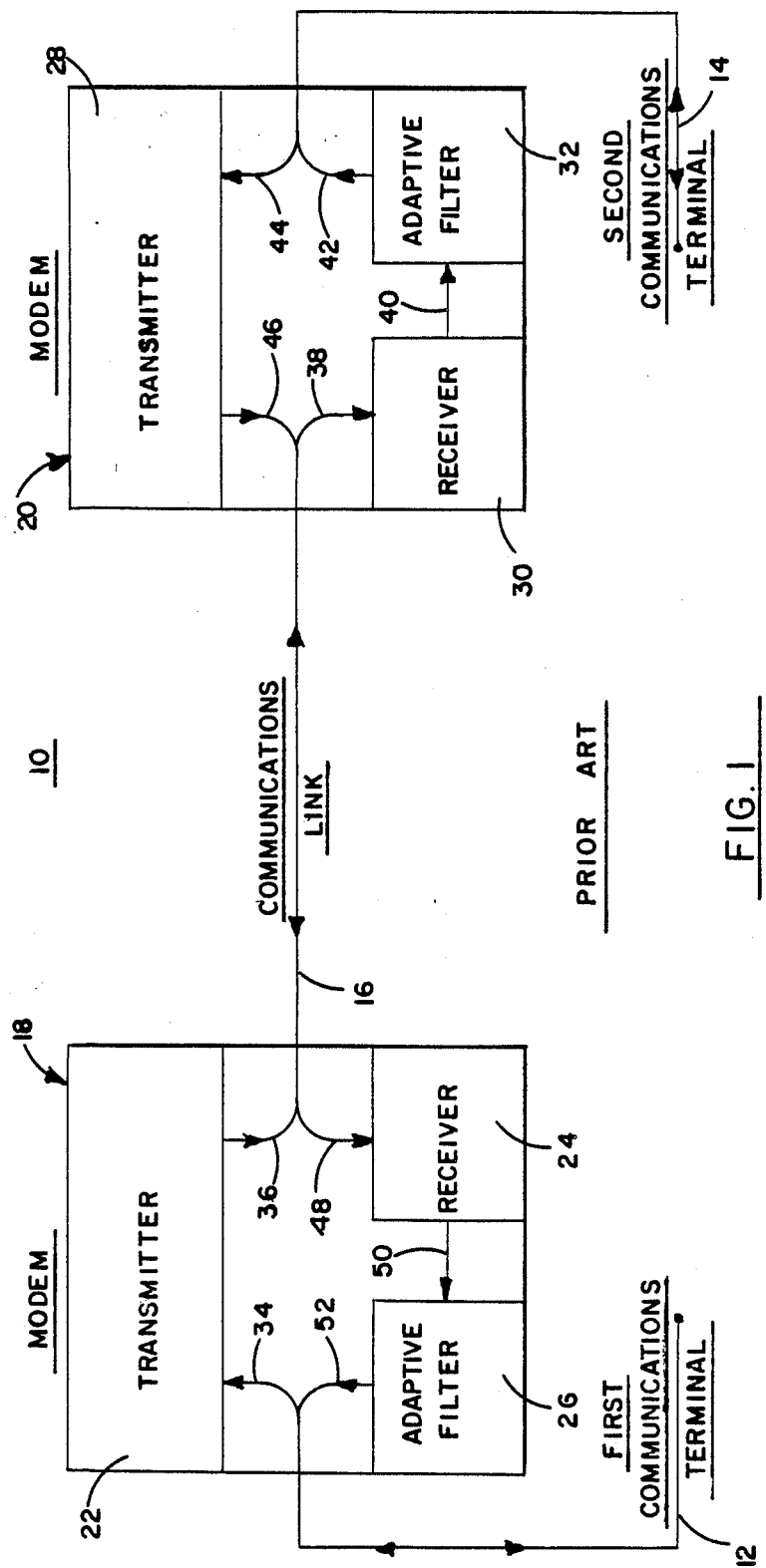
FIG. 1 is a block diagram of a prior art two-way communications system having two terminals and employing adaptive filtering of the received signals at both terminals.

Referring to FIG. 1, there is shown a block diagram of a prior art two-way communications system 10 for communicating between a first communications terminal 12 and a second communications terminal 14 via a communications link 16, which is typically a telephone line. The terminal 12 is connected to the link 16 by a first modem 18, and the second terminal 14 is connected to the link 16 by a second modem 20.

The modem 18 includes a transmitter 22, a receiver 24, and an adaptive filter 26. Similarly, the modem 20 includes a transmitter 28, a receiver 30, and an adaptive filter 32. The operation of the system 10 is as follows. For sending a first signal (generally a digital signal in the form of a stream of bits) from the terminal 12 to the terminal 14, the signal is provided on line 34 to the transmitter 22, where it is converted to an appropriate analog signal and transmitted via line 36 and the link 16 to the modem 20.

At the modem 20, the first signal is provided on line 38 to the receiver 30. The received first signal is in turn provided on line 40 to the adaptive filter 32. The purpose of the filter 32 is to compensate the received signal for the distortion imposed by the link 16. It is a characteristic of a telephone line that it causes amplitude and phase distortion of signals passing through it. The filter employs adaptive circuitry which responds to the initial reception of a signal, and adaptively modifies the characteristics of the filter to compensate for the distortion characteristics of the line. In essence, the filter characteristics are set to represent the inverse of the distortion characteristics of the line 16. A number of convergence techniques are employed to iteratively vary the filter characteristics until the distortion is adequately compensated, or equalized. When the adaptive circuits have converged to the proper filter characteristics, the compensated signal is provided to the terminal 14 via line 42. During the convergence time of the filter, no data is provided to the terminal 14. Accordingly, at the beginning of each transmission of data of the modem 20, there is an interval of time (equalizer time) during which no data is provided to the terminal 14.

For sending a second signal (also a digital signal in the form of a stream of bits) from the terminal 14 to the terminal 12, the second signal is provided on line 44 to the transmitter 22, where it is converted to an appropriate analog signal and transmitted via line 46 and the link 16 to the modem 18.

At the modem 18, the second signal is provided on line 48 to the receiver 24. The received second signal is in turn provided on line 50 to the adaptive filter 26. The purpose of the filter 26 is to compensate the received second signal for the distortion imposed by the link 16. The filter 26 acts in a similar manner to the filter 32, and also employs adaptive circuitry which responds to the initial reception of a signal, and adaptively modifies the characteristics of the filter to compensate for the distortion characteristics of the line (i.e. the filter characteristics are set to represent the inverse of the line distortion characteristics). When the adaptive circuits have converged to the proper filter characteristics, the compensated signal is provided to the terminal 14 via line 52. During the convergence time of the filter 26, no data is provided to the terminal 12. Accordingly, at the beginning of each transmission of data to the modem 18, no data is provided to the terminal 14 until the filter 26 has achieved convergence.

From the above description of the prior art system 10, it may be seen that the convergence times of the filters 26 and 32 result in lost transmission time for signals traveling in either direction. This lost time is particularly burdensome for systems which require a large number of short communications. In fact, the lost transmission time may act to nullify the advantages of a providing a higher data rate.

DESCRIPTION OF THE PREFERRED EMBODIMENTS

Figure 2:
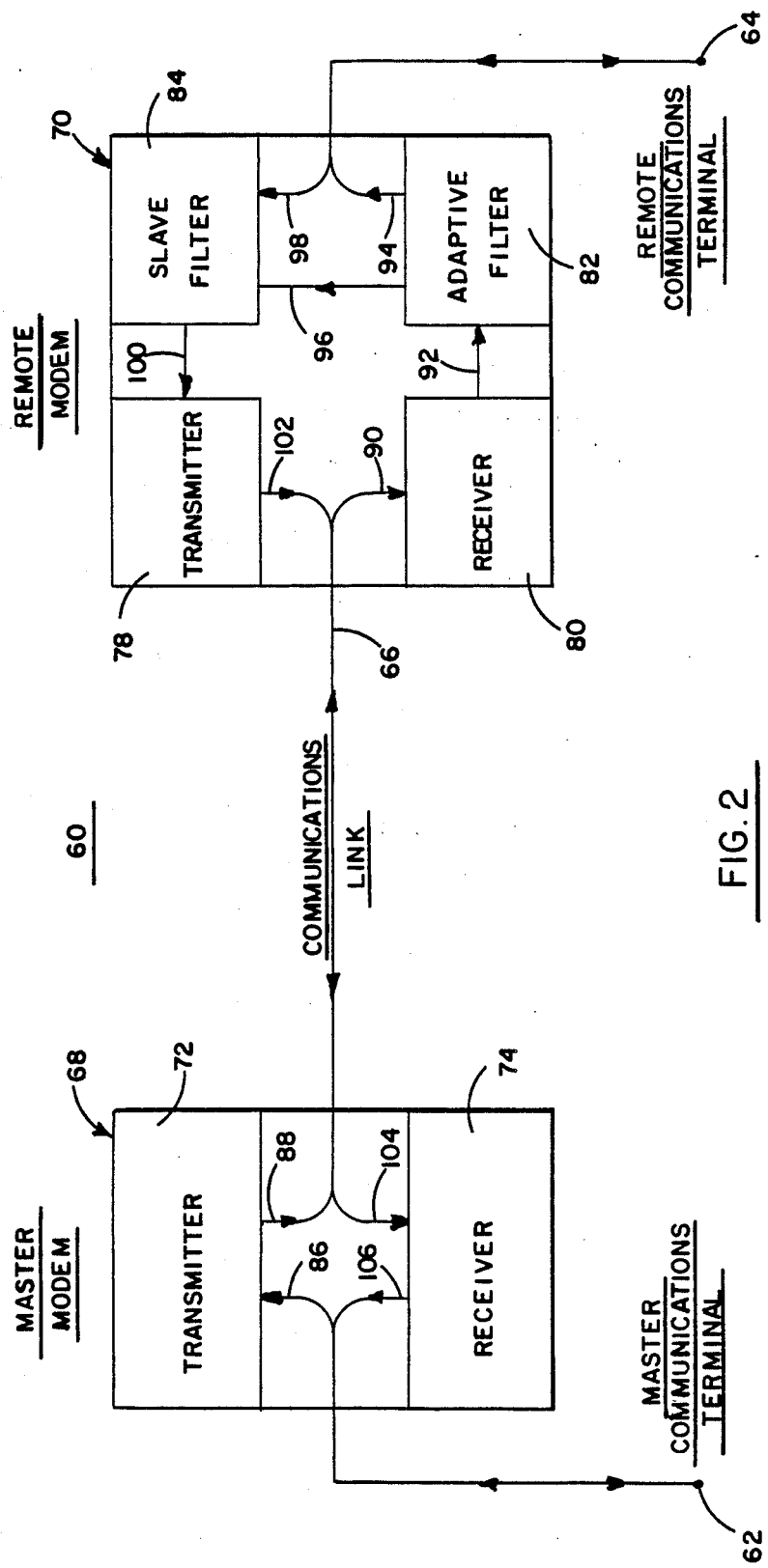
FIG. 2 is a block diagram of a two-way communications system having two terminals and embodying the teachings of the present invention, including adaptive filtering of the received and transmitted signals at one terminal.

FIG. 2 is a block diagram of a two-way communications system 60 embodying the teachings of the present invention. The system 60 communicates between a master communications terminal 62 and a remote communications terminal 64 via a communications link 66, which is typically a telephone line. The terminal 62 is connected to the link 66 by a master modem 68, and the remote terminal 64 is connected to the link 66 by a remote modem 70. The terminal 62 is referred to as the master terminal because communications in the system 60 are always initiated from this terminal. In other words, each communication begins by sending a signal from the master terminal 62 to the remote terminal 64.

The modem 68 includes a transmitter 72, and a receiver 74. The modem 70 includes a transmitter 78, a receiver 80, an adaptive filter 82, and a slave filter 84. The operation of the system 60 is as follows. For sending a first signal (generally a digital signal in the form of a stream of bits) from the terminal 62 to the terminal 64, the signal is provided on line 86 to the transmitter 72, where it is converted to an appropriate analog signal and transmitted via line 88 and the link 66 to the modem 70.

At the modem 70, the first signal is provided on line 90 to the receiver 80. The received first signal is in turn provided on line 92 to the adaptive filter 82. The purpose of the filter 82 is the same as the adaptive filter 32 in the system 10, which is to compensate the received first signal for the distortion imposed by the link 66. The filter 82 employs adaptive circuitry which responds to the initial reception of the first signal, and adaptively modifies the characteristics of the filter to compensate for the distortion characteristics of the line. Convergence techniques are employed to iteratively vary the filter characteristics until the distortion is adequately compensated, or equalized. When the adaptive circuits have converged to the proper filter characteristics (which are in essence the inverse of the line distortion characteristics), the compensated signal is provided to the terminal 64 via line 94. During the convergence time of the filter 82, no data is provided to the terminal 64. Accordingly, at the beginning of each transmission of data of the modem 70, there is an interval of time (equalizer time) during which no data is provided to the terminal 64.

The operation of the system 60 described thus far for sending signals from terminal 62 to terminal 64 is substantially identical to the operation of the prior art system 10 for signals sent from terminal 12 to terminal 14. However, the operation of the system 60 for signals sent from remote terminal 64 to master terminal 62 differs radically from the operation of prior art systems, and is as follows.

As described above, upon reception of the first signal, the adaptive filter converges to the desired filter characteristics during the equalizer time. At the completion of this time interval, the equalized first signals are provided to the terminal 64. Also at the completion of the equalizer time interval, the converged filter characteristics of the filter 82 are supplied to the slave filter 84 via line 96. Accordingly, at the completion of the equalizer time, both the adaptive filter 82 and the slave filter 84 are set to the time filter characteristics, i.e. those which are the inverse of and hence compensate for the distortion characteristics of the line 66.

The operation of the circuit 60 for a second signal sent from remote terminal 64 to master terminal 62 is now as follows. The second signal, which is always sent in response to the receipt of a first signal at the terminal 64, is provided from terminal 64 to the slave filter 84 on line 98. As described above, the slave filter 84 is already set to have the same converged filter characteristics as the adaptive filter 82. The slave filter 84 filters the second signal and provides the filtered signal to the transmitter 78 via line 100.

It has been found that most communications links of the type used in conjunction with the systems 10 and 60 possess reciprocal distortion characteristics. That is, these links act to distort signals in the same way, regardless of which direction the signals are traveling on the link. This is true even if the link is composed of more than one channel. For example, the links 16 and 66 may consist of one telephone line for communicating signals in both directions, or may consist of two telephone lines, each used to communicate a signal in one direction. In either case, it has been found that reciprocity of distortion characteristics holds true.

The system 60 makes use of the reciprocity feature of the link 66 as follows. The slave filter 84, which has its characteristics set to be the inverse of the distortion characteristics of the line 66, acts to pre-distort the second signal before it is transmitted by transmitter 78. The pre-distorted second signal is transmitted along line 66, where it is subjected to line distortion. The combination of the pre-distortion and the line distortion results in a second signal which is substantially undistorted when it arrives at the master modem 68. Accordingly, there is no need to further adaptively filter the second signal at the master modem 68. The signal is merely received on line 104 by receiver 74, and provided to master terminal 62 via line 106.

From the above description of the system 60, it may be seen that there is no need to provide any adaptive filtering at the master modem 68. Thus, there is no equalization time required in receiving signals sent from terminal 64 to terminal 62. The effect of the elimination of this equalization time is very pronounced in systems where relatively long messages are sent from the master terminal 62 to the remote terminal 64, and a large number of separate short messages are sent in the reverse direction in response to the long message. In prior art systems, each short message would require filter equalization time, which is eliminated in the present system.

Figure 3:
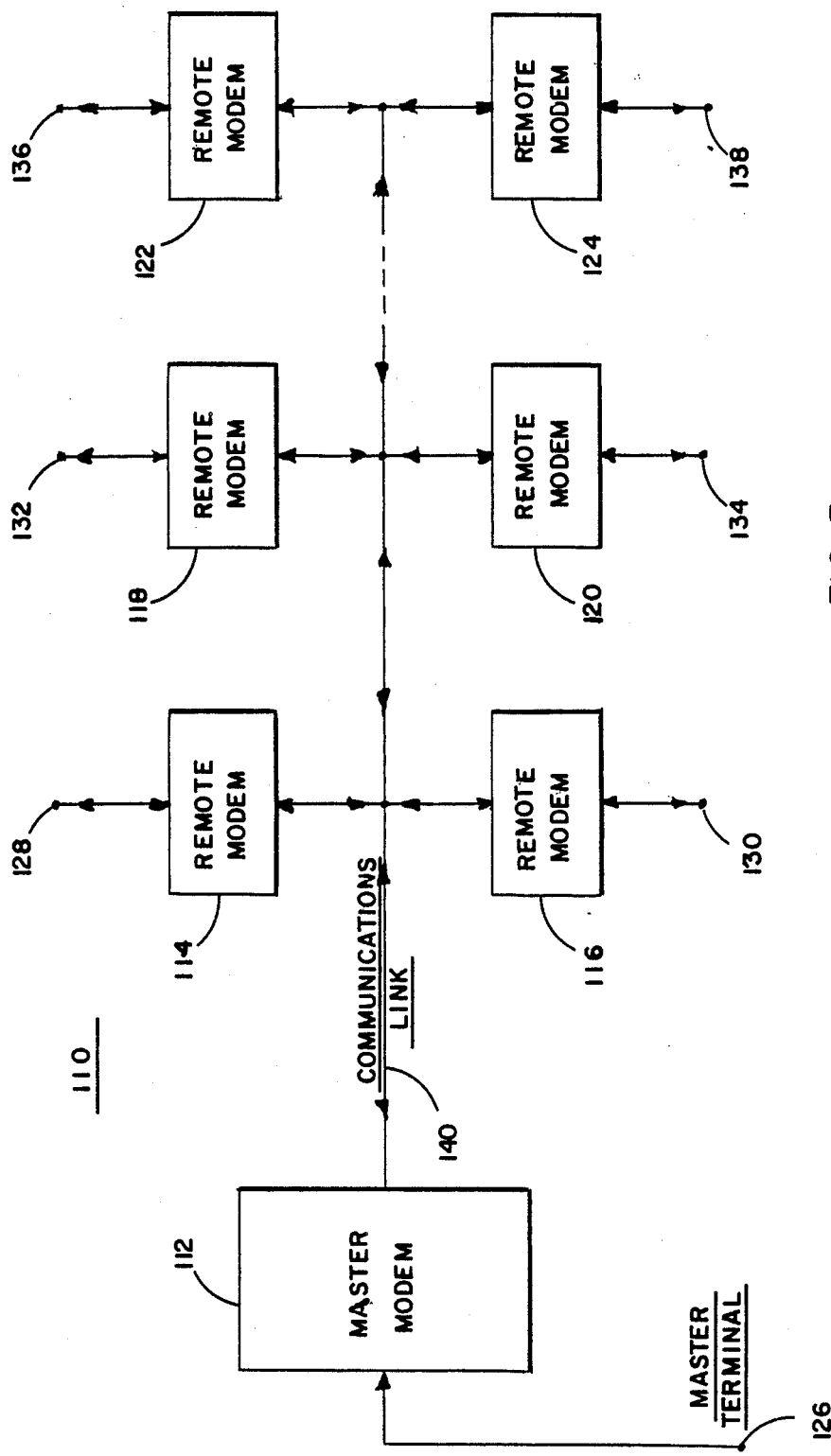
FIG. 3 is a block diagram showing the extension of the system of FIG. 2 to a polled data network having one master and several remote terminals.

FIG. 3 is a block diagram of a communications system 110 which is a multi-terminal version of the system 60 just described, and which further illustrates the advantages of the present invention. The system 110 is connected as a polled data network, and includes a master modem 112 and remote modems 114–124 to provide two-way communications between a master terminal 126 and six remote terminals 128–138, respectively. The master modem 112, which is constructed like the modem 68 of the system 60, is connected to the remote modems 114–124, which are constructed like the remote modem 70, via a communications link 140 which has the reciprocity characteristics described above.

In the operation of the system 110, the master modem 112 transmits a first message to all of the remote modems 114–124, interrogating the remote terminals for response to that message. The master modem 112 then polls all of the remote terminals in sequential fashion for the responses. From the above description of the system 60, it may be seen that only a single filter equalizing time interval is involved in the above two-way communications, whereas seven equalizing time intervals would be required for the prior art system 10. For even larger systems with more remote modems, the time savings is proportionately greater.

Figure 4:
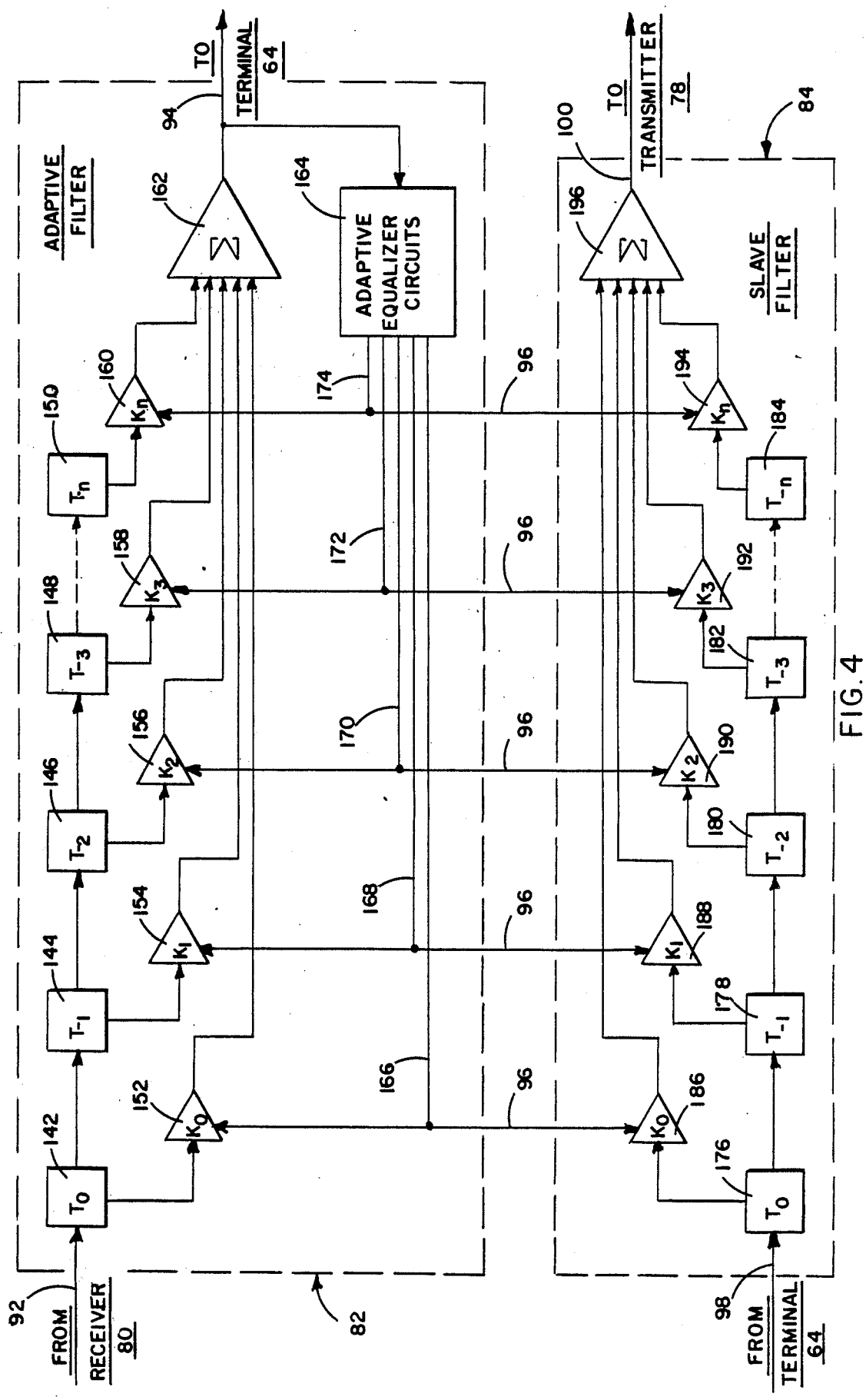
FIG. 4 is a detailed block diagram of the filtering circuits used in the system of FIG. 2.

FIG. 4 is a block diagram showing the details of the interconnections between the filters 82 and 84 in the system 60. The adaptive filter 82 is represented as a typical tapped delay line which receives an input signal from receiver 80 via line 92. The delay line includes taps 142–150, where each tap is connected via a respective gain element 152–160 to the input terminals of a summer 162. The output signal from the summer 162 is provided to the terminal 64 via the line 94.

Adaptive equalizer circuits 164 are provided which sample the signal from the summer 162 and provide control signals on lines 166–174 which act to adaptively set the gain of the gain elements 152–160, respectively. The gain element settings determine the filter characteristics. The circuits 164 vary the gain settings in an iterative manner, until the settings converge during the equalizer time to produce the desired filter characteristics.

The slave filter 84 also includes a tapped delay line which receives an input signal from terminal 64 via line 98. The delay line includes taps 176–184, where each tap is connected via a respective gain element 186–194 to the input terminals of a summer 196. The output signal from the summer 196 is provided to the transmitter 78 via the line 100.

The gain setting signals from the adaptive equalizer circuits 164 of the filter 82 are provided on lines 96 to the gain elements 186–194 of the filter 84, so that the characteristics of the filter 84 are set to substantially the same characteristics of the filter 82 at the end of the equalizer interval.

While the implementation described above employs two filter circuits to perform the functions of the adaptive and slave filters 82, 84 in the system 60, it is feasible that these functions could be accomplished with a single adaptive filter. Referring to FIG. 2, by the addition of suitable switches (not shown), the adaptive filter 82 can be connected as shown between input line 92 and output line 94 during the time the remote modem 70 is receiving, and then switched over in place of the slave filter between input line 98 and output line 100 during the time the remote modem is transmitting. In this position, the adaptive circuits 164 of the filter 82 would be disabled, so that the converged filter characteristics would not be altered during transmission.

It will be apparent to those skilled in the art that the preceding descriptions of embodiments of the invention may be substantially varied to meet particular requirements without departing from the true spirit and scope of the invention disclosed. Therefore, the embodiments described are not to be taken as indicative of the limits of the invention but rather are exemplary structures of the invention which is defined by the claims appended hereto.

What is claimed is:

1. A two-way communications system for transferring signals in both directions between a first site and a second site via a bi-directional communications link having signal distortion characteristics which are substantially identical for signals traveling in either direction, comprising:
   first receiver means located at the second site;
   second receiver means located at the first site;
   first transmitter means located at the first site for transmitting a first signal to the first receiver means via the communications link:
   second transmitter means located at the second site for transmitting a second signal to the second receiver means via the communications link;
   first filter means located at the second site for filtering the received first signal, where the first filter means includes an adaptive filter for adaptively establishing a first set of filter coefficients during a first interval of time in response to the received first signal, where the first set of filter coefficients determines filter characteristics of the first filter means and where said filter characteristics are substantially the inverse of the communications link signal distortion characteristics to compensate the received first signal for the distortion of the communications link, thus providing a substantially undistorted version of the first signal; and
   second filter means located at the second site for filtering the second signal to form a filtered second signal which is transmitted by the second transmitter, where the second filter means is responsive to the first set of filter coefficients, which establishes the filter characteristics of the second filter means as substantially the same as the filter characteristics of the first filter means, and where the second signal is transmitted after the completion of the first interval of time, whereby the transmitted filtered second signal is compensated for the distortion of the communications link, so that the filtered second signal is received as a substantially undistorted version of the second signal.

2. In a two-way communications system for transmitting a first signal from a first transmitter located at a first site to a first receiver located at a second site via a bi-directional communications link having signal distortion characteristics which are substantially identical for signals traveling in either direction, and for transmitting a second signal via the communications link from a second transmitter located at the second site to a second receiver located at the first site, the improvement comprising:
   first filter means located at the second site for filtering the received first signal, where the first filter means includes an adaptive filter for adaptively establishing a first set of filter coefficients during a first interval of time in response to the received first signal, where the first set of filter coefficients determines the filter characteristics of the first filter means and where said filter characteristics are substantially the inverse of the communications link signal distortion characteristics to compensate the received first signal for the distortion of the communications link, thus providing a substantially undistorted version of the first signal; and
   second filter means located at the second site for filtering the second signal to form a filtered second signal, where the second filter means is responsive to the first set of filter coefficients, which establishes the filter characteristics of the second filter means as substantially the same as the filter characteristics of the first filter means, and where the second signal is transmitted after the completion of the first interval of time, whereby the transmitted filtered second signal is compensated for the distortion of the communications link, so that the filtered second signal is received as a substantially undistorted version of the second signal.

3. A method of compensating for communications link signal distortion in a two-way communications system for transferring signals in both directions between a first site and a second site via a bi-directional communications link having signal distortion characteristics which are substantially identical for signals traveling in either direction, comprising:
   providing first receiver means located at the second site;
   providing second receiver means located at the first site;
   providing first transmitter means located at the first site for transmitting a first signal to the first receiver means via the communications link:
   providing second transmitter means located at the second site for transmitting a second signal to the second receiver means via the communications link;
   first filtering with first filter means located at the second site the received first signal, including the step of adaptively establishing a first set of filter coefficients during a first interval of time in response to the received first signal, where the first set of filter coefficients determines the filter characteristics of the first filter means, where said filter characteristics are substantially the inverse of the communications link signal distortion characteristics to compensate the received first signal for the distortion of the communications link, thus providing a substantially undistorted version of the first signal; and second filtering with second filter means located at the second site the second signal to form a filtered second signal which is transmitted by the second transmitter, including the steps of responding to the first set of filter coefficients, establishing the filter characteristics of the second filter means as substantially the same as the filter characteristics of the first filter means, and transmitting the second signal after the completion of the first interval of time so that the transmitted filtered second signal is compensated for the distortion of the communications link, whereby the filtered second signal is received as a substantially undistorted version of the second signal.

4. A two-way communications system for transferring signals in both directions between a first site and a second site via a bi-directional communications link having signal distortion characteristics which are substantially identical for signals traveling in either direction, comprising:

first receiver means located at the second site;
second receiver means located at the first site;
first transmitter means located at the first site for transmitting a first signal to the first receiver means via the communications link:
second transmitter means located at the second site for transmitting a second signal to the second receiver means via the communications link;
filter means located at the second site with filter characteristics which are substantially the inverse of the communications link signal distortion characteristics
connection means located at the second site responsive to the first signal for connecting the filter means to the first receiver means for filtering the received first signal so that it is compensated for the distortion of the communications link, thus providing a substantially undistorted version of the first signal, and responsive to the second signal for connecting the filter means to the second transmitter means to form a filtered second signal which is transmitted by the second transmitter, so that the transmitted filtered second signal is compensated for the distortion of the communications link, whereby the filtered second signal is received as a substantially undistorted version of the second signal.

5. The communications system of claim 4 in which the filter means includes an adaptive filter for adaptively establishing a set of filter coefficients in response to the received first signal, where the set of filter coefficients determines the filter characteristics of the filter means.

6. A two-way communications system for transferring signals in both directions between a first site and a second site and between the first site and a third site via a bi-directional communications link having signal distortion characteristics which are substantially identical for signals traveling in either direction, comprising:

first receiver means located at the second site;
second receiver means located at the first site;
third receiver means located at the third site:
first transmitter means located at the first site for transmitting a first signal to the first receiver means and the third receiver means via the communications link;
second transmitter means located at the second site for transmitting a second signal to the second receiver means via the communications link;
third transmitter means located at the third site for transmitting a third signal to the second receiver means via the communications link;
first filter means located at the second site with filter characteristics which are substantially the inverse of the communications link signal distortion characteristics
first connection means located at the second site responsive to the first signal for connecting the first filter means to the first receiver means for filtering the received first signal so that it is compensated for the distortion of the communications link, thus providing a substantially undistorted version of the first signal, and responsive to the second signal for connecting the first filter means to the second transmitter means to form a filtered second signal which is transmitted by the second transmitter, so that the transmitted filtered second signal is compensated for the distortion of the communications link, whereby the filtered second signal is received as a substantially undistorted version of the second signal; and
second filter means located at the third site with filter characteristics which are substantially the inverse of the communications link signal distortion characteristics
second connection means located at the third site responsive to the first signal for connecting the second filter means to the third receiver means for filtering the received first signal so that it is compensated for the distortion of the communications link, thus providing a substantially undistorted version of the first signal, and responsive to the third signal for connecting the second filter means to the third transmitter means to form a filtered third signal which is transmitted by the third transmitter, so that the transmitted filtered third signal is compensated for the distortion of the communications link, whereby the filtered third signal is received as a substantially undistorted version of the third signal.

* * * * *